(12) United States Patent
Oblizajek et al.

(10) Patent No.: US 7,299,117 B2
(45) Date of Patent: Nov. 20, 2007

(54) METHODS FOR EVALUATING DYNAMIC CHARACTERISTICS OF VEHICLE DAMPERS AT LOW VELOCITIES

(75) Inventors: Kenneth L. Oblizajek, Troy, MI (US); Carl T. Wright, Highland, MI (US); Shawn G. Quinn, Grand Blanc, MI (US); John D. Sopoci, West Bloomfield, MI (US); Gregory J. Fadler, Commerce Township, MI (US); William C. Gregory, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 408 days.

(21) Appl. No.: 11/100,315

(22) Filed: Apr. 6, 2005

(65) Prior Publication Data

US 2006/0229791 A1   Oct. 12, 2006

(51) Int. Cl.
*B60G 17/018* (2006.01)
(52) U.S. Cl. .................. 701/37; 701/29; 73/11.07
(58) Field of Classification Search .............. 701/1, 701/29, 31, 36, 37, 38, 79; 703/7, 8; 73/11.05, 73/11.07, 11.08, 11.09
See application file for complete search history.

(56) References Cited

U.S. PATENT DOCUMENTS 6,360,580 B1 *  3/2002  Muller ..................... 73/11.04
7,194,398 B2 *  3/2007  Abe ........................... 703/8

OTHER PUBLICATIONS

U.S. Appl. No. 11/100,315, filed Apr. 6, 2005, Quinn et al.

* cited by examiner

Primary Examiner—Richard M. Camby

(57) ABSTRACT

The ability of a damper to attenuate smooth road shake in a vehicle is tested using a test fixture that is controlled by inputting data for periodic low amplitude periodic excitations having a selected frequency range, selected amplitude range and a selected dither representative of vehicle operation on relatively smooth roads. The selected frequency range is about 5 Hz to 30 Hz and the selected amplitude range is about 0.05 mm to 2.00 mm. A preferred frequency is about 15 Hz which is applied preferably for about 200 cycles in a series of separate tests at individual amplitudes of, for example, 0.05, 0.10, 0.15, 0.20, 0.25, 0.50, 1.00 and 2.00 mm. The damper is tested to produce low amplitude test results comprising displacement, force and velocity parameters, measured as functions of time.

17 Claims, 14 Drawing Sheets

METHODS FOR EVALUATING DYNAMIC CHARACTERISTICS OF VEHICLE DAMPERS AT LOW VELOCITIES

FIELD OF THE INVENTION

The present invention is directed to methods for evaluating dynamic characteristics of vehicle dampers at relatively low levels of excitation. The methods are directed to measurement and analysis enabling assessment of the ability of a damper to provide desirable vehicular vibratory performance at these low levels of excitation.

BACKGROUND OF THE INVENTION

As a vehicle is operated on a road, irregularities in the road surface induce movements of the vehicle's tires. These movements in turn are transmitted through the vehicle suspension to the vehicle interior. The damper component of the suspension is designed, among other things, to manage movements of the vehicle body and suspension mass, as well as the transmissibility of road excitation to body motion. Equipment designed to measure and test damper configurations are known as shock press machines and are used to quantify dampers for their role in these functions.

In addition, there are irregularities in rotating components located at corners of vehicles, such as imbalance, out of roundness and eccentricities in tires, wheels and brake rotors. These irregularities also result in internal vehicular forces which produce movements that are transmitted to the vehicle interiors. These movements are most notable on smooth roads for which an external source of the movement is not apparent and are referred to collectively as "smooth road shake." Current dampers are usually not effective in reducing the transmissibility of these irregular movements. These dampers are typically evaluated and developed on conventional damper measurement systems which are not designed to measure the dampers under conditions representative of operation on smooth roads.

Conventional shock press machines are designed to exercise and measure dampers at relatively large displacements, e.g., several mm and velocities, e.g., 1 m/sec. Control movement and measuring forces and velocities at very small displacements in the range of 0.050 to 2 mm (peak-to-peak), as are typical of operation on smooth roads, is an undertaking not currently practiced. Accordingly, in order to effectively design dampers, such as the dampers for vehicle suspensions disclosed in co-pending and co-assigned U.S. Patent Application titled "Dual Stage Dampers For Vehicle Suspension" (Attorney Docket No. GP-304924), incorporated herein in its entirety by reference, new methods for testing damper designs are needed.

SUMMARY OF THE INVENTION

In view of the aforementioned considerations, the present invention is directed to methods for measuring the ability of a damper to attenuate smooth road shake and other road excited vehicular vibrations while operating on smooth roads.

The method comprises controlling a test fixture mounting the damper by inputting the data for periodic sinusoidal excitations having a selected frequency range and a selected amplitude range, a selected dither representative of operation on smooth roads and acquiring relevant response data therefrom. While the damper is mounted in the test fixture, the damper is tested over a number of cycles to produce small amplitude test results comprising displacement, force and velocity parameters measured as functions of time. Impedance phase and gain factors are determined as functions of peak-to-peak sinusoidal excitation force or velocity amplitudes.

In a further aspect of the method, the frequency range is from about 5 Hz to about 30 Hz, the displacement ranges from about 0.05 mm to about 2 mm and the number of cycles for each displacement forming a portion of the test is in the range of to 1000.

In still a further aspect of the invention, the number of cycles is at least 200 and the frequency is about 15 Hz.

In still a further aspect of the invention a desired side load is applied to the test fixture.

In still a further aspect of the method, drive frequency amplitude and phase for displacement, velocity and force parameters are calculated by averaging cycles for each using Fourier transforms, or equivalent, to obtain a composite expression for each parameter.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1A:
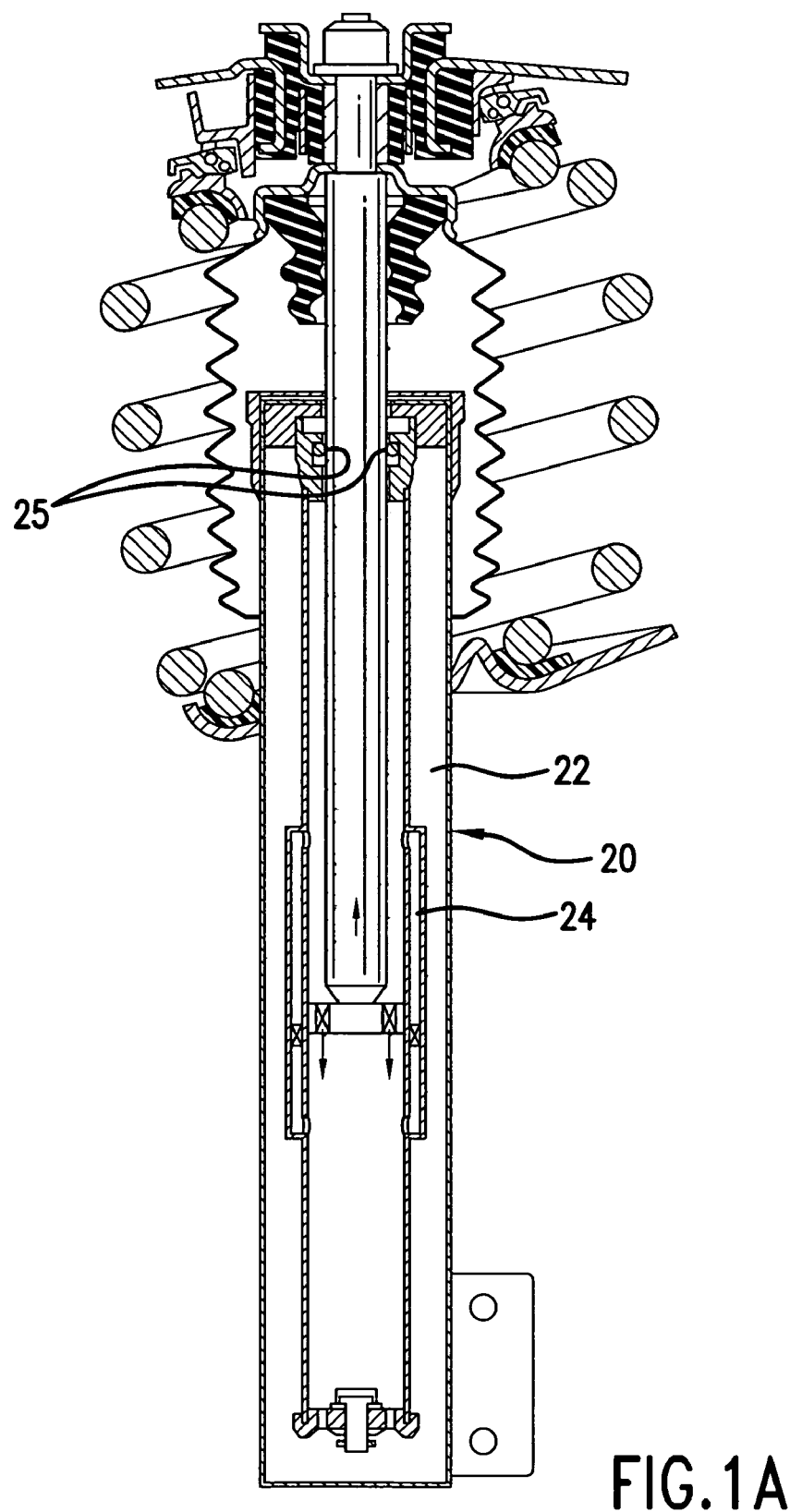
FIG. 1A is an elevation of a shock absorber using a twin-tube damper that is tested in accordance with the principles of the present method.
Figure 1B:
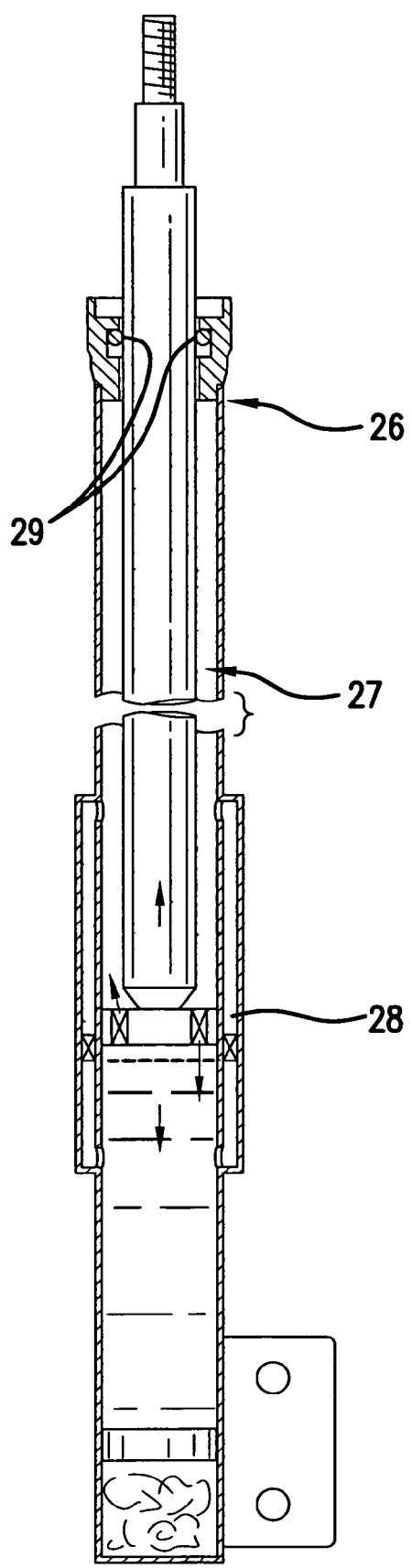
FIG. 1B is an elevation of a mono-tube damper that is tested in accordance with the principles of the present method.

FIGS. 1A and 1B show twin-tube and mono-tube dampers 20 and 22, respectively, which are the subject of a co-pending and co-assigned U.S. Patent Application, titled "Dual Stage Dampers For Vehicle Suspensions" (Attorney Docket No. GP-304924), incorporated herein in its entirety by reference. FIG. 1A discloses a twin-tube damper 20 having a first stage 22, which responds to relatively large road irregularities currently addressed in the art, and having a second stage 24 which responds to small irregularities contributing to "smooth road shake." The damper 20 has a seal-to-rod interface 25. Mono-tube damper 26 of FIG. 1B responds to relatively large road irregularities in a first stage 27 and includes a second stage 28 which also dominates responses for "smooth road shake." Typically, the first stages 22 and 27 of the dampers 20 and 26 dominate responses for relatively large displacements of several mm, whereas the second stages 24 and 28 dominate responses for small displacements as in the range of about 0.05 mm to about 2.0 mm. The second stages 24 and 28 are of interest with respect to practicing the method of this invention. The damper 26 has a seal-to-rod interface 29.

Figure 2A:
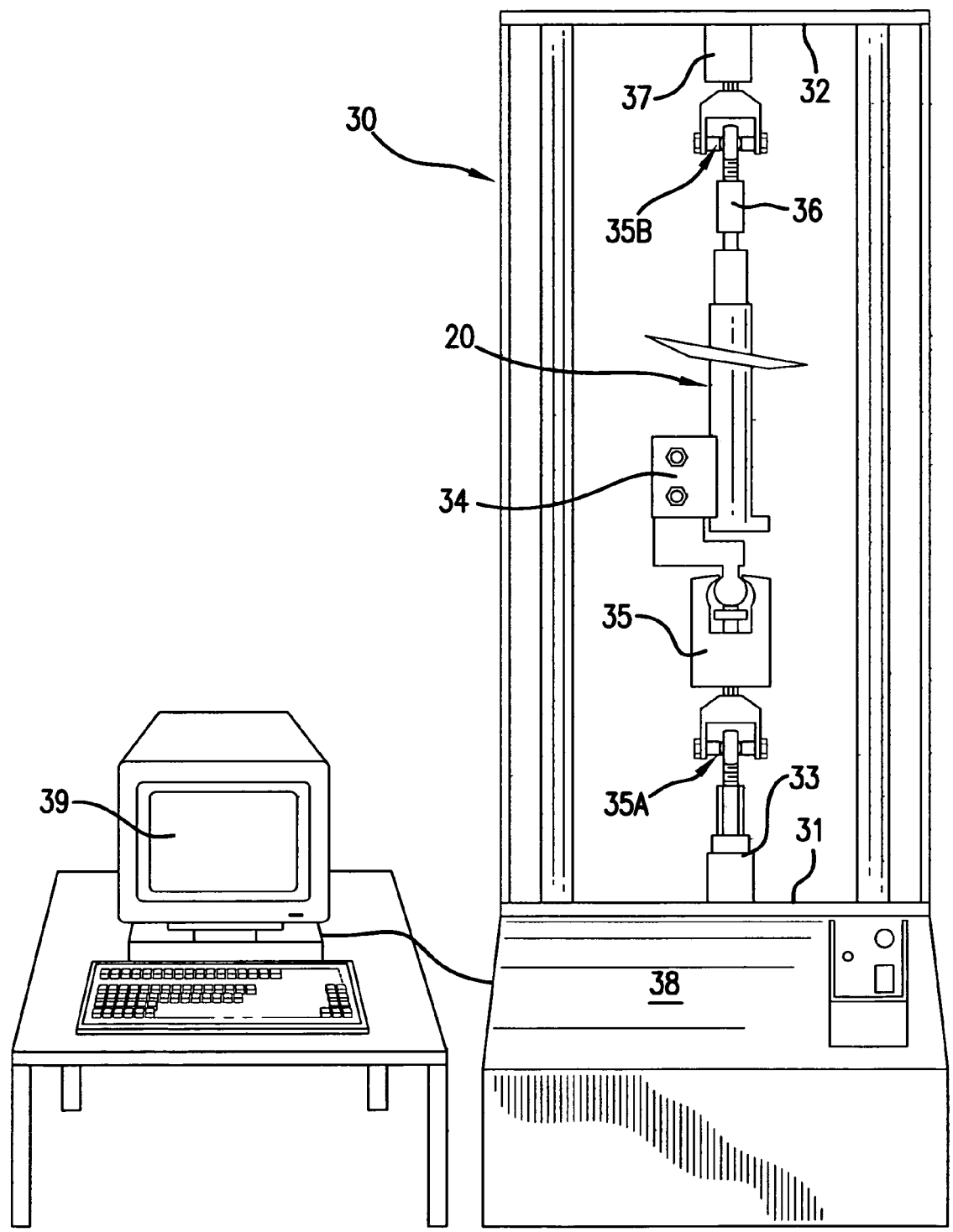
FIG. 2A is a perspective view of a shock press machine for testing dampers such as the damper of FIG. 1 without a side load.

In order to evaluate the performance of any damper, and in particular, dampers, such as the dampers 20 or 26 having second stage damping, a shock press machine 30 such as that shown in FIG. 2A is utilized when no side load is applied. The shock press machine 30 has a base 31 on which a hydraulic press 32 is mounted. Disposed between the base 31 and the press 32 is a damper with one end affixed to the hydraulically excited actuator 33. The vertical actuator 33 is coupled to lower flanged end 34 of the damper 20 by a coupling 35. The upper end 36 of the damper 20 is coupled through a load cell 37 to the hydraulic press 32. Upper attachment rod end 36A and lower attachment rod end 35A are multi-axis bearings used to eliminate any side load which would be induced in the damper 20 or 26 due to misalignment during damper installation in the shock press machine 20. A damper test controller 38 drives the test and a computer 39 records data from the test. While the damper 20 is illustrated in FIG. 2A, any damper may be subjected to this method of testing.

Figure 2B:
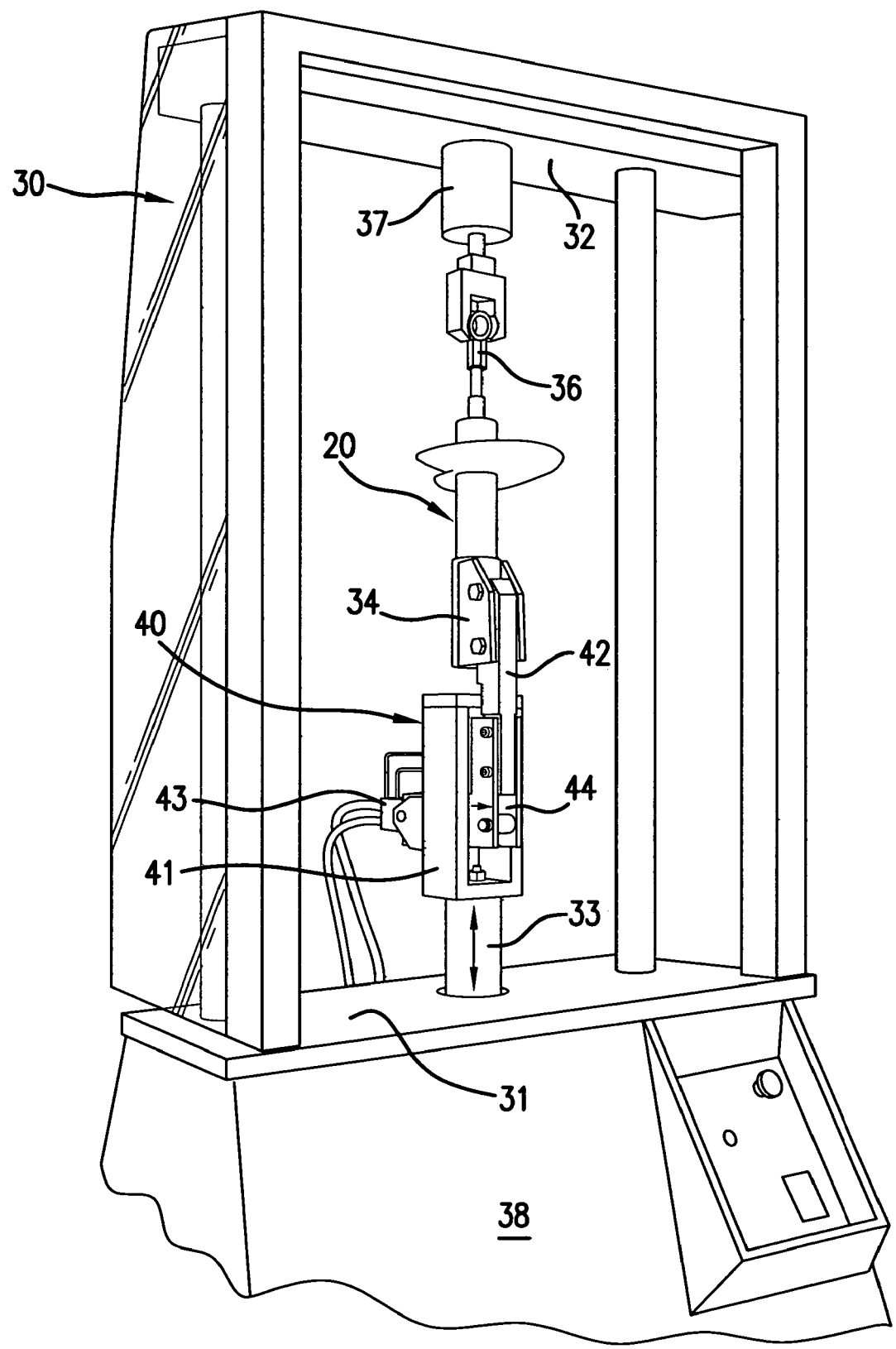
FIG. 2B is a view similar to FIG. 2A but including an actuator for imparting a side load to a damper.

As is seen in FIG. 2B, if a side load is employed, a lateral actuator 40 is used in the shock press machine 30 to apply a lateral force to the damper 20 (or 26). The lateral actuator 40 includes a rectangular frame 41 that is bolted at its lower end to the vertical actuator 33. A lug 42 is bolted at its upper end to the lower end flanges 34 on the damper 20 and is bolted at its lower end to a hydraulic ram 43 attached to the frame 41 that applies a side load laterally to the lug 42 through a flanged connection 44 and thus to the lower end of the damper 20. The amount of side load is determined at the seal-to-rod interface 25 of the damper 20 and at the seal-to-rod interface 29 of the damper 26 (see FIGS. 1A and 1B).

Generally in conducting a test it is necessary to program the controller 38 of the shock press machine 30 to monitor small displacement amplitudes generally in the range of about 0.05 to 2 mm (peak-to-peak) having a frequency band of interest between about 5 to 30 Hz. In accordance with the presented embodiment, 15 Hz is the preferable frequency for exciting the damper 20. The entire test is run in test portions, each test portion having a selected nominal displacement amplitude(pp), with each responsive dynamic displacement monitored for a number of cycles, for example about 200 cycles.

Figure 3:
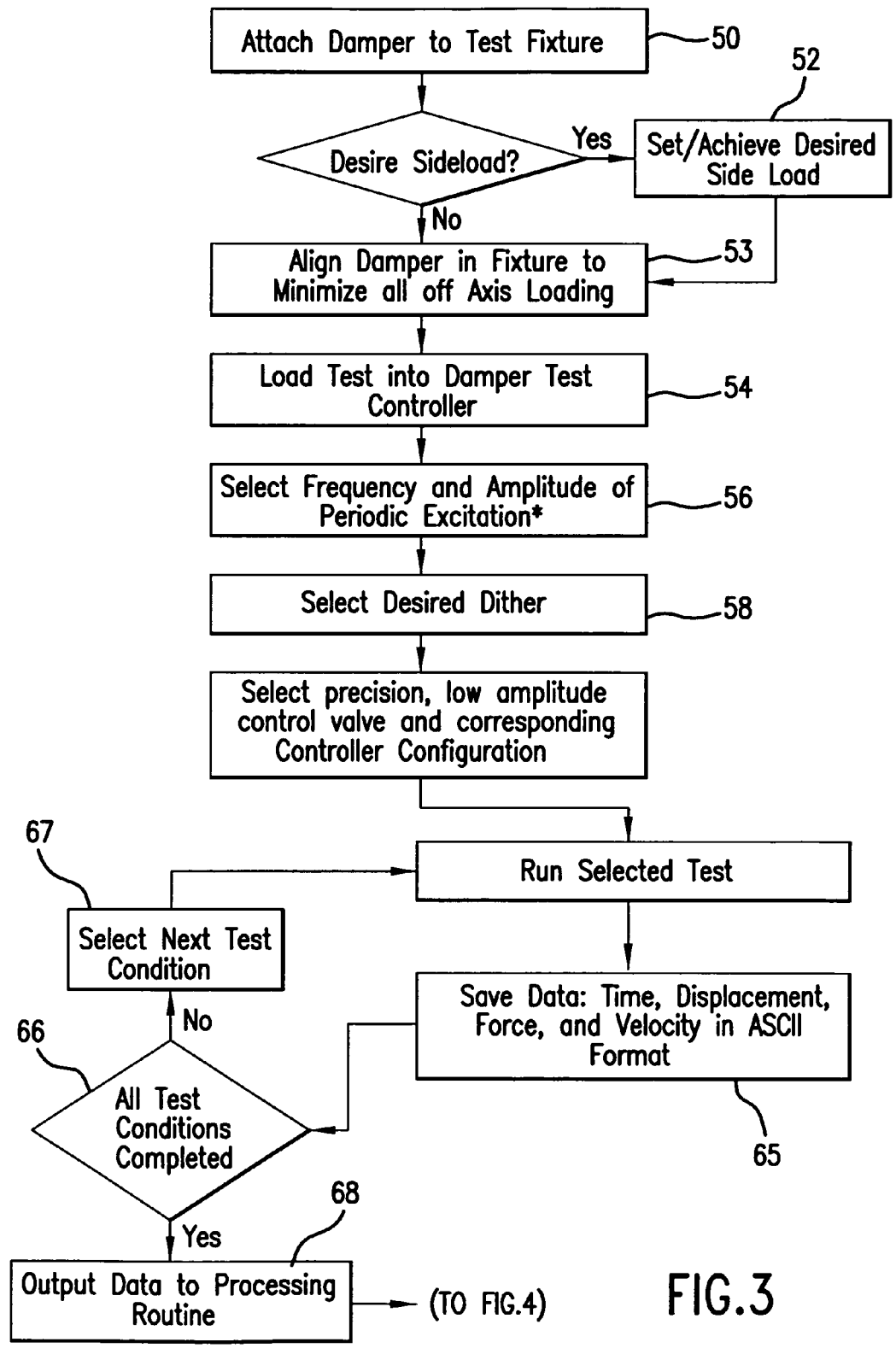
FIG. 3 is a flow chart for acquiring data for tests involving small displacement amplitudes using the apparatus of FIG. 2.

Referring now to FIG. 3, the damper 20 is secured to the shock press machine 30 in an initial step 50. If an optional side load 52 is desired, the lateral actuator 40 of FIG. 2A is activated in step 52 to provide a lateral force against the damper. Testing with a side load is optional. In step 53, before test parameters are loaded into the damper test controller 38, the damper 20 is properly aligned in the shock press machine 30 to minimize all off-axis loading if there is no applied side load 52. In step 54, the controller 38 is loaded with the test and in step 56 the controller is provided with a cycle setting, a frequency setting and nominal amplitude settings (pp). In the preferred embodiment, the cycle setting is 200 cycles and the frequency setting is 15 Hz. The amplitude settings begin at about 0.05 mm for the first test and increase for subsequent tests up to about 2 mm. In step 58, the shock press machine 30 is optionally loaded with a desired dither displacement, the dither displacement is can be determined by measuring the displacement of the damper 20 on a smooth road surface using a representative vehicle. The dither displacement is superimposed over periodic displacements caused by irregularities in the rotating components of the vehicle. The combined dither and sinusoidally periodic excitation produces a test environment similar to that of operation on the smooth road, enabling evaluation of realistic responses of the highly nonlinear damper. The data processing system is programmed to separate the damper response to the periodic displacement from the dither displacement.

A separate test is run for each nominal displacement amplitude (pp) at a selected number of cycles and frequency, for example, 200 cycles are run at 15 Hz with a displacement 0.05 mm. The data from the test 0.05 mm run which includes time, displacement amplitude, force and velocity is stored in a file 65. After determining in step 66 that all test conditions have not been completed, the next test condition is selected in step 67, for example 200 cycles at 15 Hz with a displacement amplitude of 0.10 mm. Examples of the displacement amplitudes for each test of 200 cycles at 15 Hz are amplitudes of 0.05, 0.10, 0.15, 0.20, 0.50, 1.00 and 2.00 mm. The testing procedure is continued until test runs are conducted at all eight amplitudes with the results stored in file 65. The test information stored in the file 65 is then outputted in step 68 to the processing routine of FIG. 4.

Figure 4:
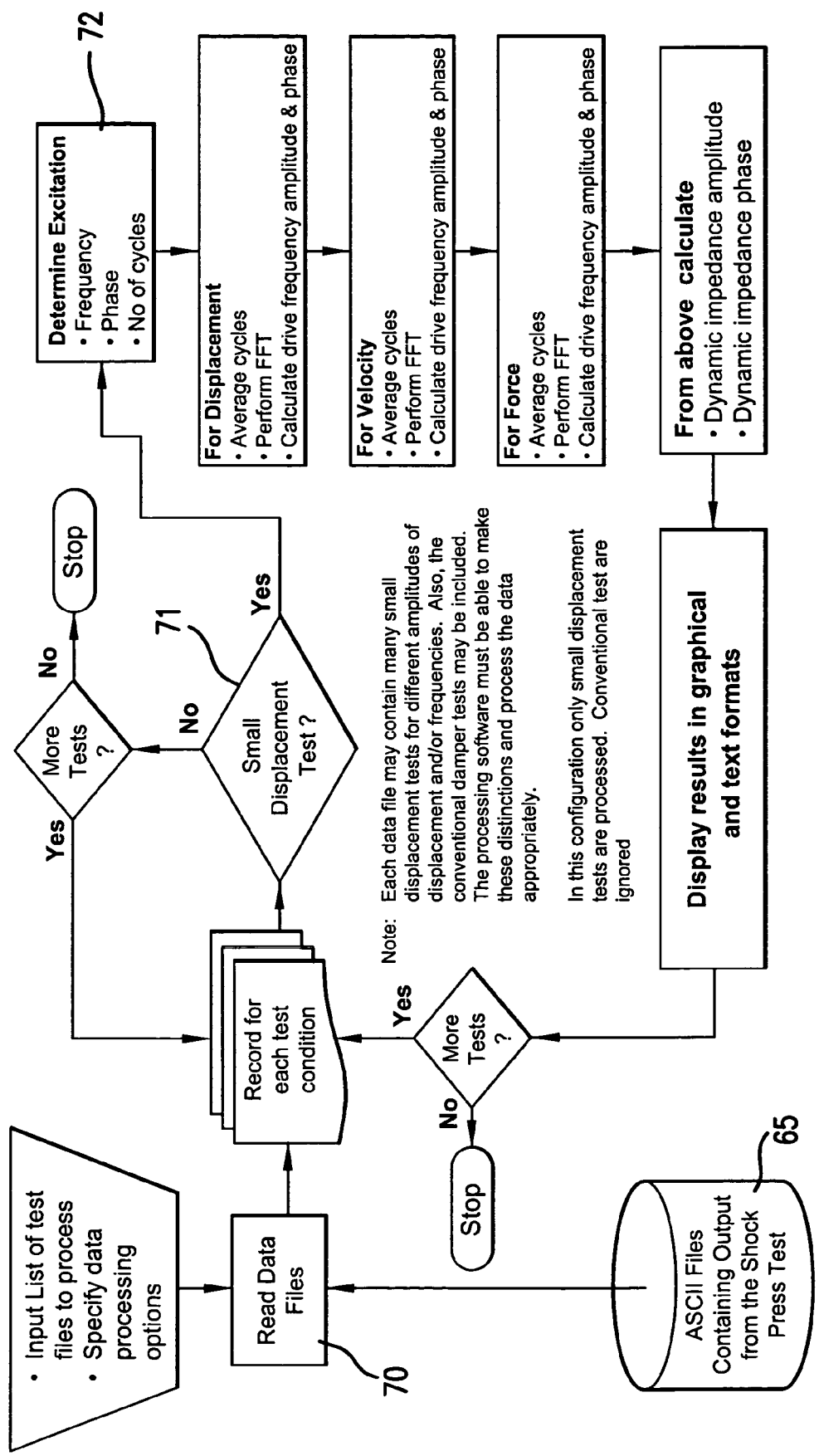
FIG. 4 is a flow diagram for processing the data from tests conducted in accordance with FIG. 3.

Referring now to FIG. 4 generally, the data in the file 65 are time averaged over periodic cycles and then transformed, via Fourier techniques to form reliable data samples of periodic displacement, velocity and force. As previously stated, the preferred method excites a damper, such as the damper 20 (or 26) at 15 Hz for 200 repetitive cycles so that data are sampled at 200 data points per periodic sample. The data are then averaged to perform a set of representative data for a single cycle of displacement, velocity and force. The displacement, velocity, force, periodic amplitude and phases of averaged periodic cycles are then extracted using a Fourier transform. A dynamic impedance gain factor (see FIG. 18) is then calculated by dividing the amplitude of the Fourier peak force by the amplitude of the Fourier peak periodic velocity. A dynamic impedance phase factor (see force phase Factor, FIG. 17) is then calculated by subtracting the periodic velocity phase parameter from the periodic force phase parameter.

In FIG. 4, data are read from the file 65 in step 70 and it is determined whether the data is from a small displacement test by decision tree 71. Initially, sinusoidal excitation is determined in block 72 for the 15 Hz input at a selected displacement phase and averaged over about 200 cycles. More specifically, with respect to determining sinusoidal excitation in terms of frequency, phase and number of cycles the analysis begins with time history of the drive signal using, for example 200 cycles, to improve fidelity of the data. The actual number of cycles needed depends upon the resolutional of the instrumentation and the mechanical performance of the shock press. If the instrumentation does not exactly signal the beginning and end of a cycle, the following numerical approach is used for instrumentation that does not provide such a reference. First, a Fourier transform of the time history is used to obtain a rough estimate of amplitude, frequency and phase. Next, using a non-linear least squares method, a cosine wave illustrating amplitude frequency and phase is derived that best fits the time history. From, the cosine wave a report of frequency, phase and number of cycles is produced. Once the frequency phase and number of cycles is known, the input and response signals are averaged to produce an average cycle.

EXAMPLE 1

Figure 5:
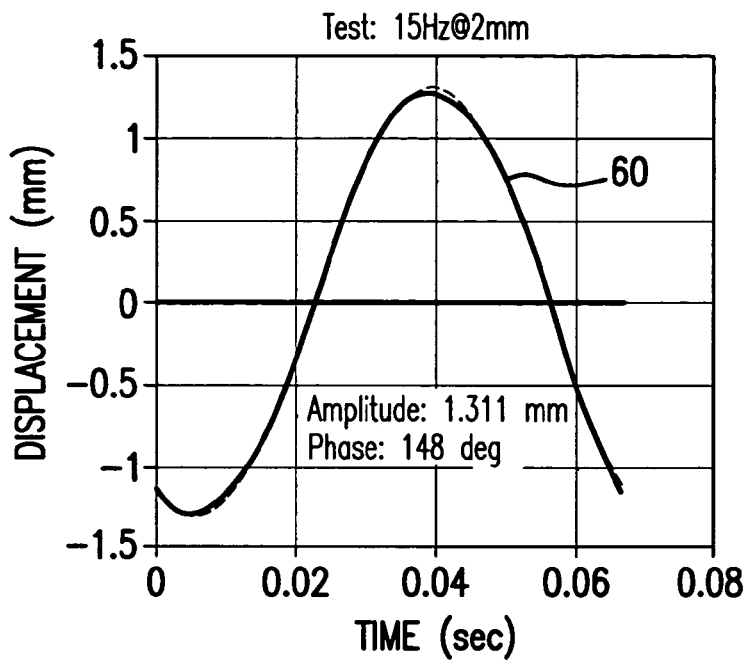
FIG. 5 is a graph plotting displacement as a function of time for a first selected displacement amplitude.
Figure 6:
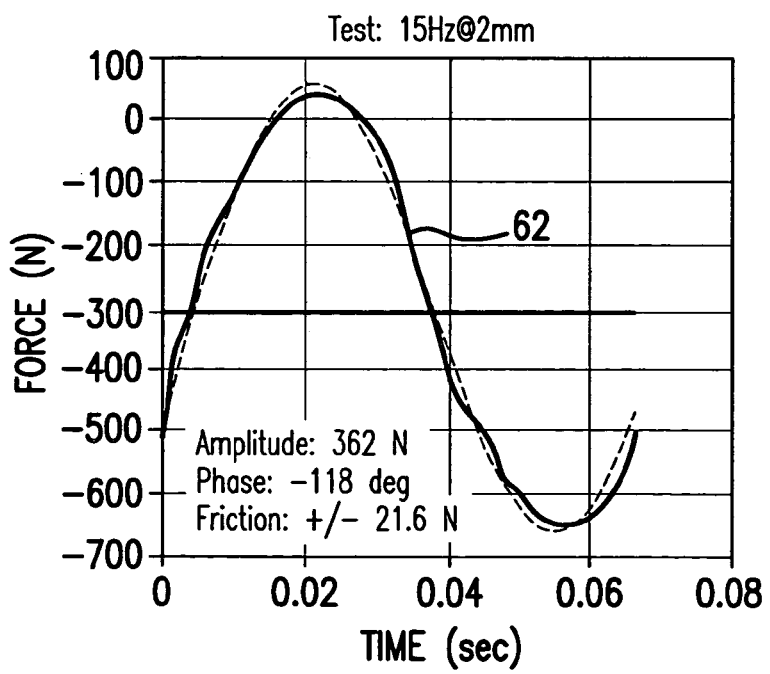
FIG. 6 is a graph plotting force as a function of time for the selected displacement amplitude of FIG. 5.

FIGS. 5 and 6 plot in a first test example displacement and force curves 60 and 62, respectively, as a function of time, showing a response to 15 Hz sinusoidal excitations applied to the damper 20 (FIG. 1A) by the actuator 33 (FIG. 2). In the illustrated example, the fixed displacement sinusoidal input amplitude is about +/−1.3 mm having a displacement phase of about 148°. The displacement curve 60 of FIG. 5 represents data measured averaged over about 200 cycles. The first harmonic component, or dominant Fourier component (dotted line) of curve 60 corresponds closely to the curve 60. Referring to FIG. 6, input force is measured simultaneously and is processed in the same manner as the displacement amplitude of FIG. 5. In the illustrated example, the Force Amplitude is 362 Newtons (N) and the Force Phase is −188°, resulting in a Damper Stiffness Phase Factor of 94° and a Dynamic Stiffness Gain Factor of 276 Newton/mm.

EXAMPLE 2

Figure 7:
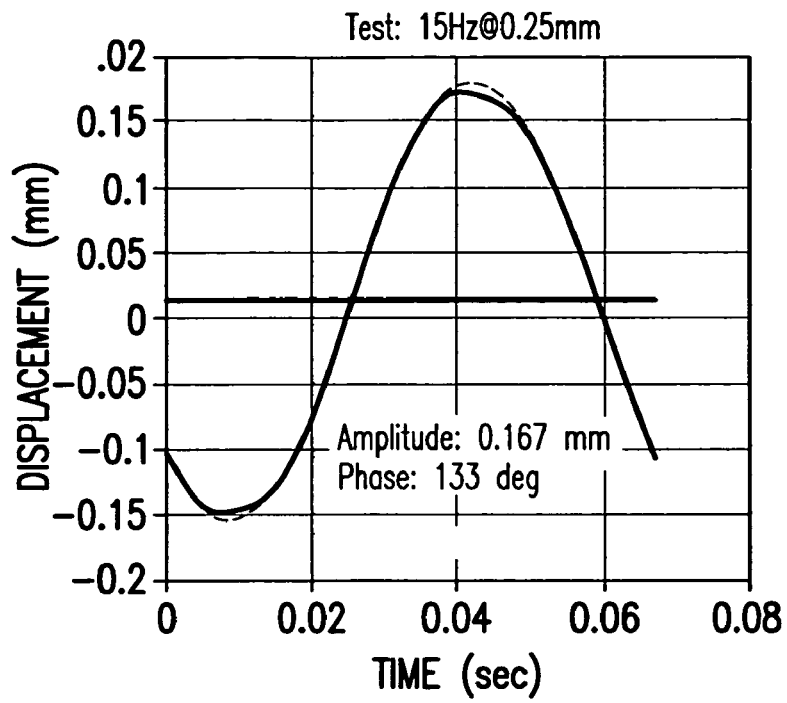
FIG. 7 is a graph plotting displacement as a function of time for a second displacement amplitude.
Figure 8:
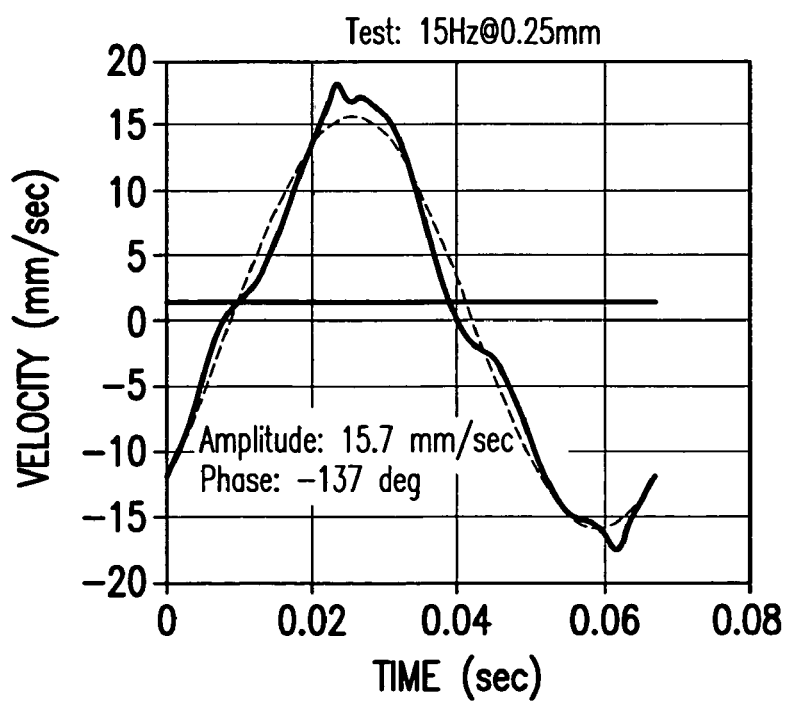
FIG. 8 is a graph plotting velocity as a function of time for the displacement of FIG. 7.
Figure 9:
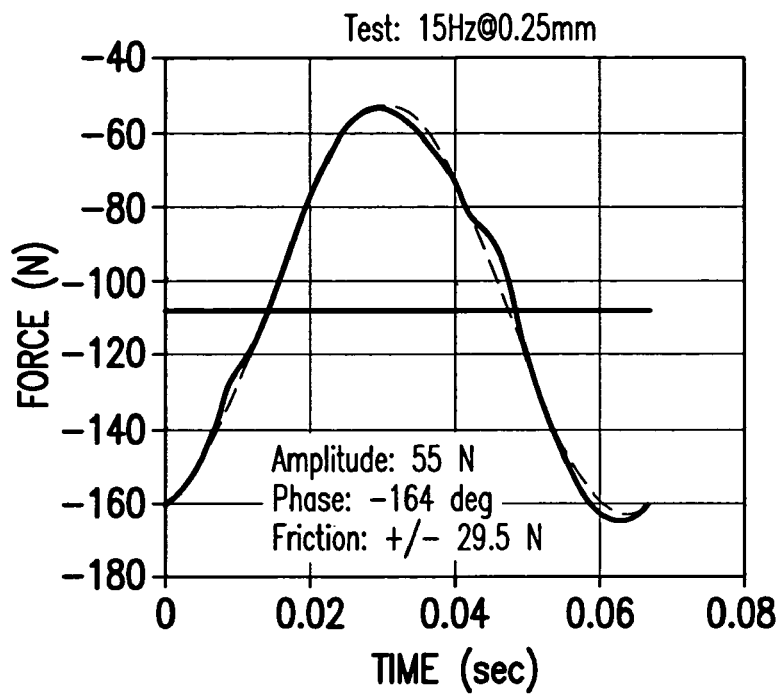
FIG. 9 is a graph plotting force as a function of time for the displacement of FIG. 7.
Figure 10:
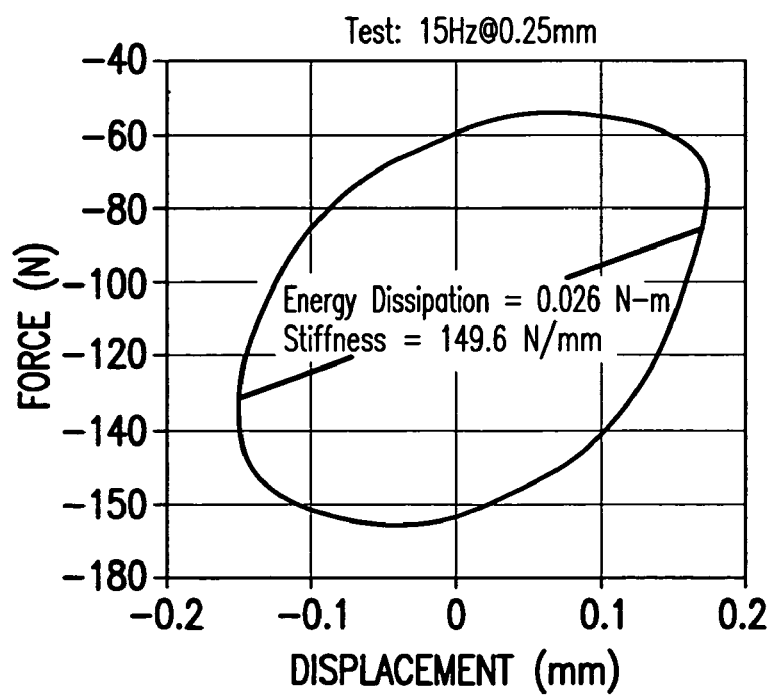
FIG. 10 is a graph plotting force as a function of displacement for the displacement of FIG. 7.
Figure 11:
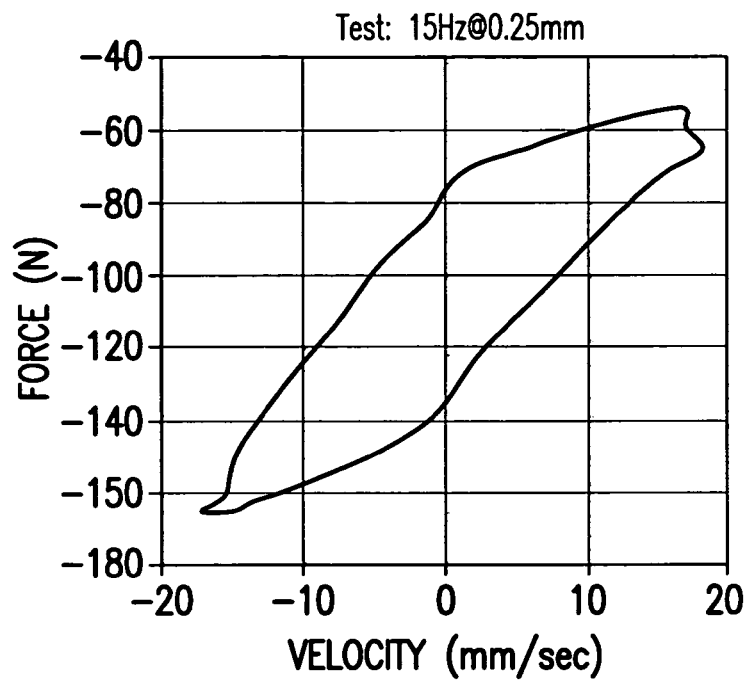
FIG. 11 is a graph plotting force as a function of velocity for the displacement of FIG. 7.

FIGS. 7-9 plot, displacement, velocity and force using a second displacement as functions of time for a maximum, +/−0.167 mm displacement input of the damper 20 at 15 Hz with no side load, while FIGS. 10 and 11 plot force as functions of displacement and velocity, also at a +/−0.167 mm input maximum displacement and 15 Hz. In FIGS. 6-8 the displacement, velocity and force measured at the damper and first harmonics thereof track closely. As is seen in FIG. 9, both energy dissipation and stiffness of the damper are determinable from force and displacement.

EXAMPLE 3

Figure 12:
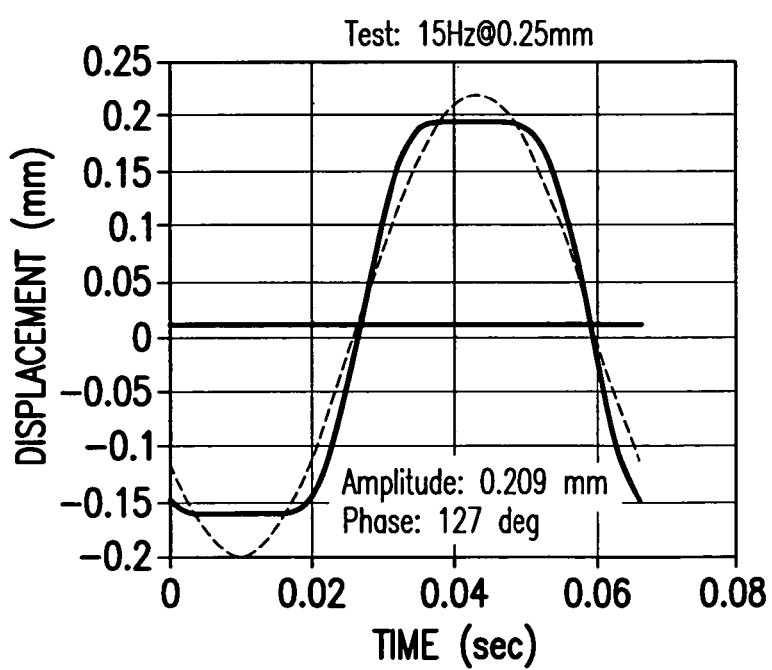
FIGS. 12, 13 and 14 are graphs plotting displacement, velocity and force, respectively as functions of time for the second displacement of FIGS. 7-11 with a side load applied.
Figure 13:
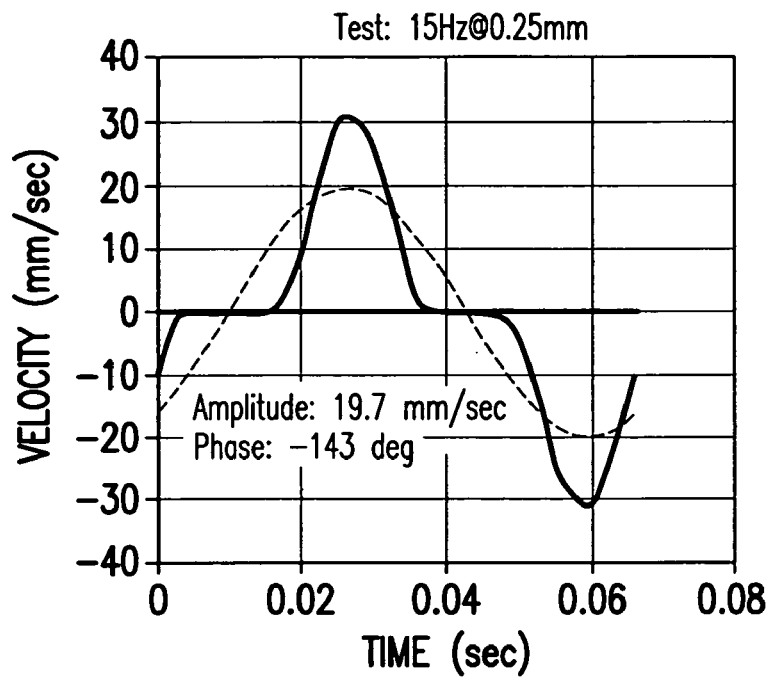
Figure 14:
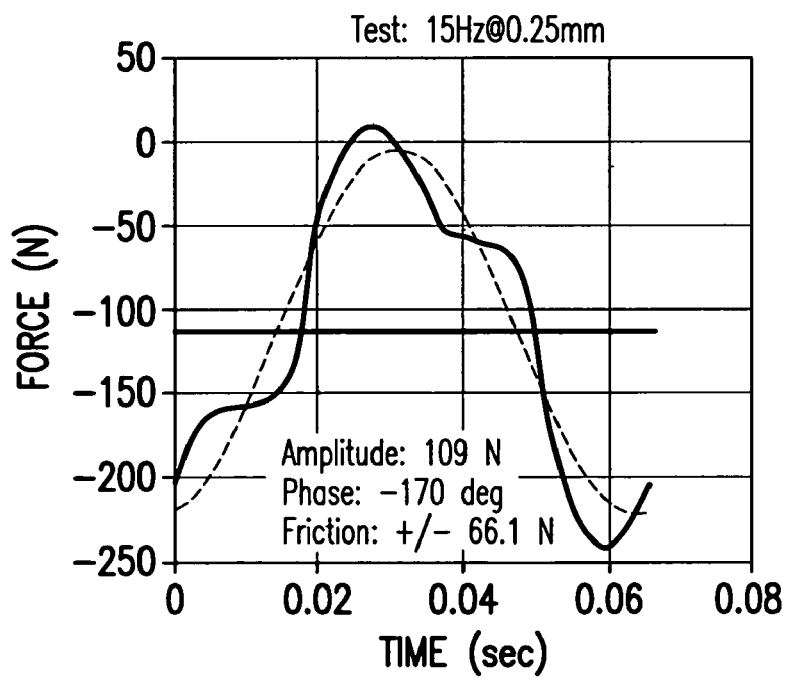
Figure 15:
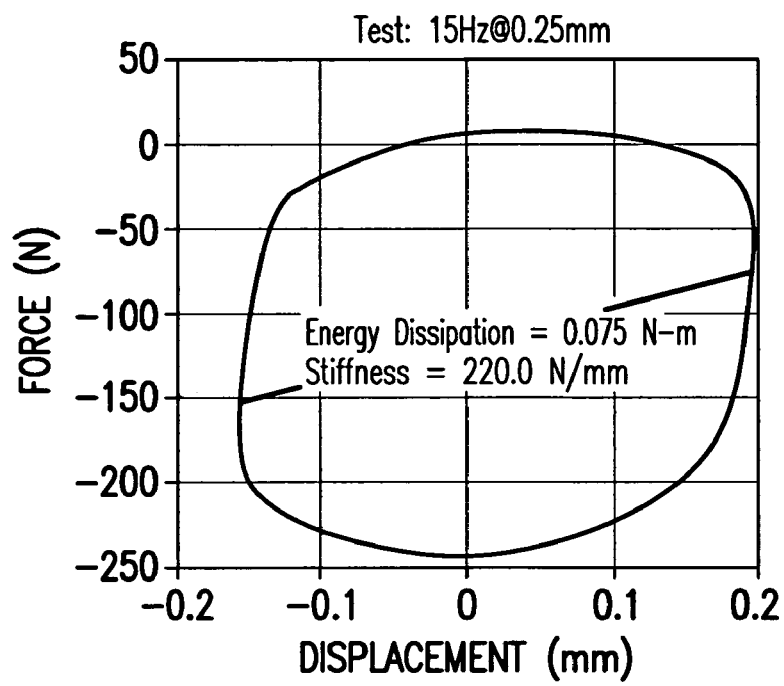
FIGS. 15 and 16 are graphs plotting force as a function of displacement and force as a function of velocity for the second displacement of FIGS. 7-11 with the side load of FIGS. 12-14.
Figure 16:
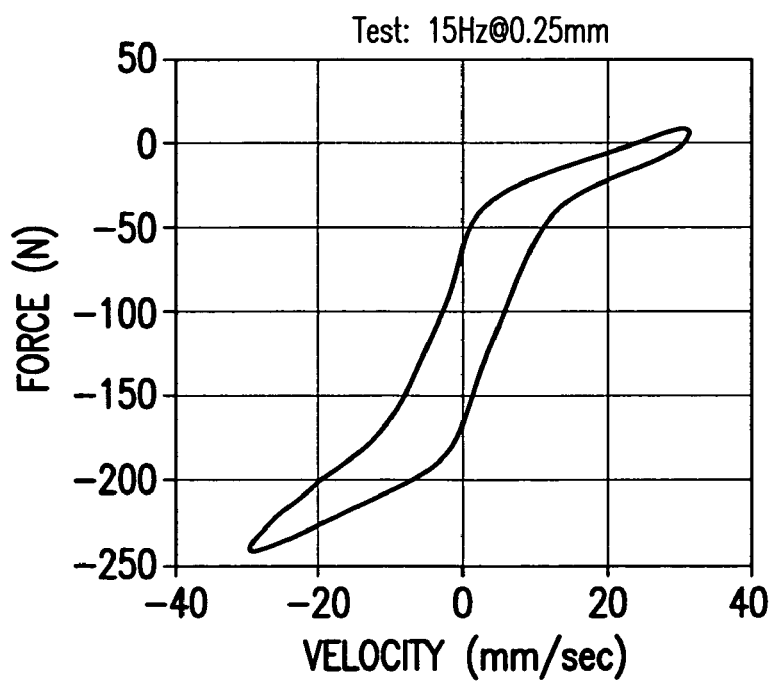

FIGS. 12, 13 and 14 plot displacement, velocity and force for a third displacement as a function of time using the 15 Hz, +/−0.167 mm parameters of FIGS. 6-10, but with a side load of +/−250N. The curves of first harmonic content is shown in dotted lines. In the curve of FIG. 15 it is seen that the energy dissipated by the damper 20 is increased from 0.026 N-m in FIG. 9 to 0.75 N-m in FIG. 15 with the stiffness increasing from 149.6 N/mm to 220.0 N/mm. In the plots of force as a function of velocity of FIGS. 11 and 16, the side load causes the compressive and expansive parts of the cycle in FIG. 16 to correspond more closely to one another then in FIG. 11.

Mathematically, the data for FIGS. 12-16 is processed as follows to determine data for a single average cycle with a side load:

$$RawData = \begin{bmatrix} t_1 & x_1 & v_1 & F_1 \\ t_2 & x_2 & v_2 & F_2 \\ \vdots & \vdots & \vdots & \vdots \\ t_{n*c} & x_{n*c} & v_{n*c} & F_{n*c} \end{bmatrix}$$

RawData contains the data for one damper displacement value over a sufficient period of time so as to acquire data for c cycles with n data points per cycle for a total of n*c data points. The data acquired include time, t, displacement, x, velocity, v, and force, F. For a typical test there will be data taken at several levels of displacement so that there will be several corresponding RawData matricies. Each is processed individually as described below. These RawData are first averaged to calculate the average cycle for displacement, velocity, and force as follows:

$$xa_k = \frac{1}{c}\sum_{i=1}^{n} x_{k+n*(c-1)}, \text{ for } k=1,2,\ldots n \text{ Average cycle for displacement}$$

$$va_k = \frac{1}{c}\sum_{i=1}^{n} V_{k+n*(c-1)}, \text{ for } k=1,2,\ldots n \text{ Average cycle for velocity}$$

$$Fa_k = \frac{1}{c}\sum_{i=1}^{n} F_{k+n*(c-1)}, \text{ for } k=1,2,\ldots n \text{ Average cycle for force}$$

The above formulations use n points per cycle for c cycles. The sampling rate of the measurement system may not correspond to exactly n points per cycle or may not have a precise method of determining the beginning of each cycle. In this case, non-linear curve fitting and interpolating techniques must be employed to obtain data points at the desired sampling intervals.

The cycle period is determined from the time data as follows:

$$\text{Period} = t_{n+1} - t_1$$

The cycle frequency is determined from the Period as follows:

$$Freq = \frac{1}{\text{Period}}$$

To calculate the first harmonic content of displacement as a function of time (FIG. 12) the following steps are preferred:

$$X_1 = \frac{1}{n}\sum_{i=1}^{n} xa_i e^{-2j\pi \frac{i}{n}}$$

Those skilled in the art will recognize the above equation for $X_1$ as the first term of the discrete Fourier Transform. The $X_1$ quantity is a complex number, i.e., it has real and imaginary parts. As such, $X_1$ may be expressed as a amplitude and phase as follows:

$$AmpX = |X_1| = 0.209 \text{ mm in FIG. 12}$$

$$PhaseX = \arg(X_1) = a\tan\left(\frac{\text{imag}(X_1)}{\text{real}(X_1)}\right) = 127 \text{ deg in FIG. 12}$$

To calculate the first harmonic content of velocity as a function of time (FIG. 13) the following steps are preferred:

$$V_1 = \frac{1}{n}\sum_{i=1}^{n} va_i e^{-2j\pi\frac{i}{n}}$$

Those skilled in the art will recognize the above equation for $V_1$ as the first term of the discrete Fourier Transform. The $V_1$ quantity is a complex number, i.e., it has real and imaginary parts. As such, $V_1$ may be expressed as a amplitude and phase as follows:

$$AmpV = |V_1| = 19.7 \frac{\text{mm}}{\text{sec}} \text{ in FIG. 13}$$

$$PhaseV = \arg(V_1) = a\tan\left(\frac{\text{imag}(V_1)}{\text{real}(V_1)}\right) = -143 \text{ deg in FIG. 13}$$

To calculate the first harmonic content of force as a function of time (FIG. 13) the following steps are preferred:

$$F_1 = \frac{1}{n}\sum_{i=1}^{n} Fa_i e^{-2j\pi\frac{i}{n}}$$

Those skilled in the art will recognize the above equation for $F_1$ as the first term of the discrete Fourier Transform. The $F_1$ quantity is a complex number, i.e., it has real and imaginary parts. As such, $F_1$ may be expressed as a amplitude and phase as follows:

$$AmpF = |F_1| = 109N \text{ in FIG. 14}$$

$$PhaseF = \arg(F_1) = a\tan\left(\frac{\text{imag}(F_1)}{\text{real}(F_1)}\right) = -170 \text{ deg in FIG. 14}$$

The dynamic impedance may now be calculated as follows:

$$Z = \frac{F_1}{V_1}$$

The dynamic impedance, Z, is a complex number, i.e., it has real and imaginary parts. As such, Z may be expressed as a gain factor and phase factor as follows:

Dynamic impedance $GainFactor = |Z_1|$

Dynamic impedance $PhaseFactor = \arg(Z) = a\tan\left(\frac{\text{imag}(Z)}{\text{re}(Z)}\right)$ The dynamic stiffness may now be calculated as follows:

$$K = \frac{F_1}{X_1}$$

The dynamic stiffness, K, is a complex number, i.e., it has real and imaginary parts. As such, K may be expressed as a gain factor and phase factor as follows:

Dynamic stiffness $GainFactor = |K_1|$

Figure 17:
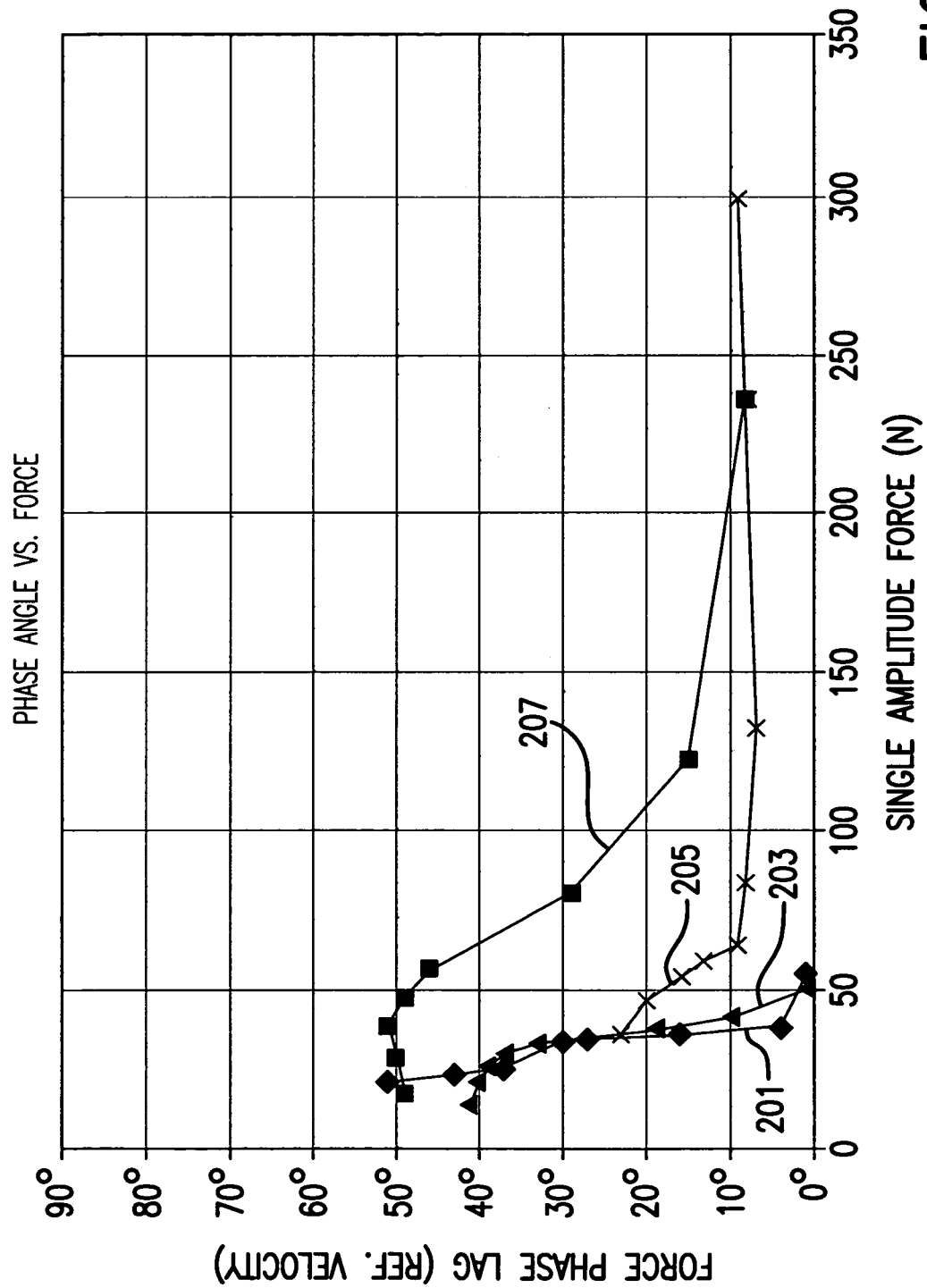
FIG. 17 is a graph plotting phase angle as a function of force for several vehicles.
Figure 18:
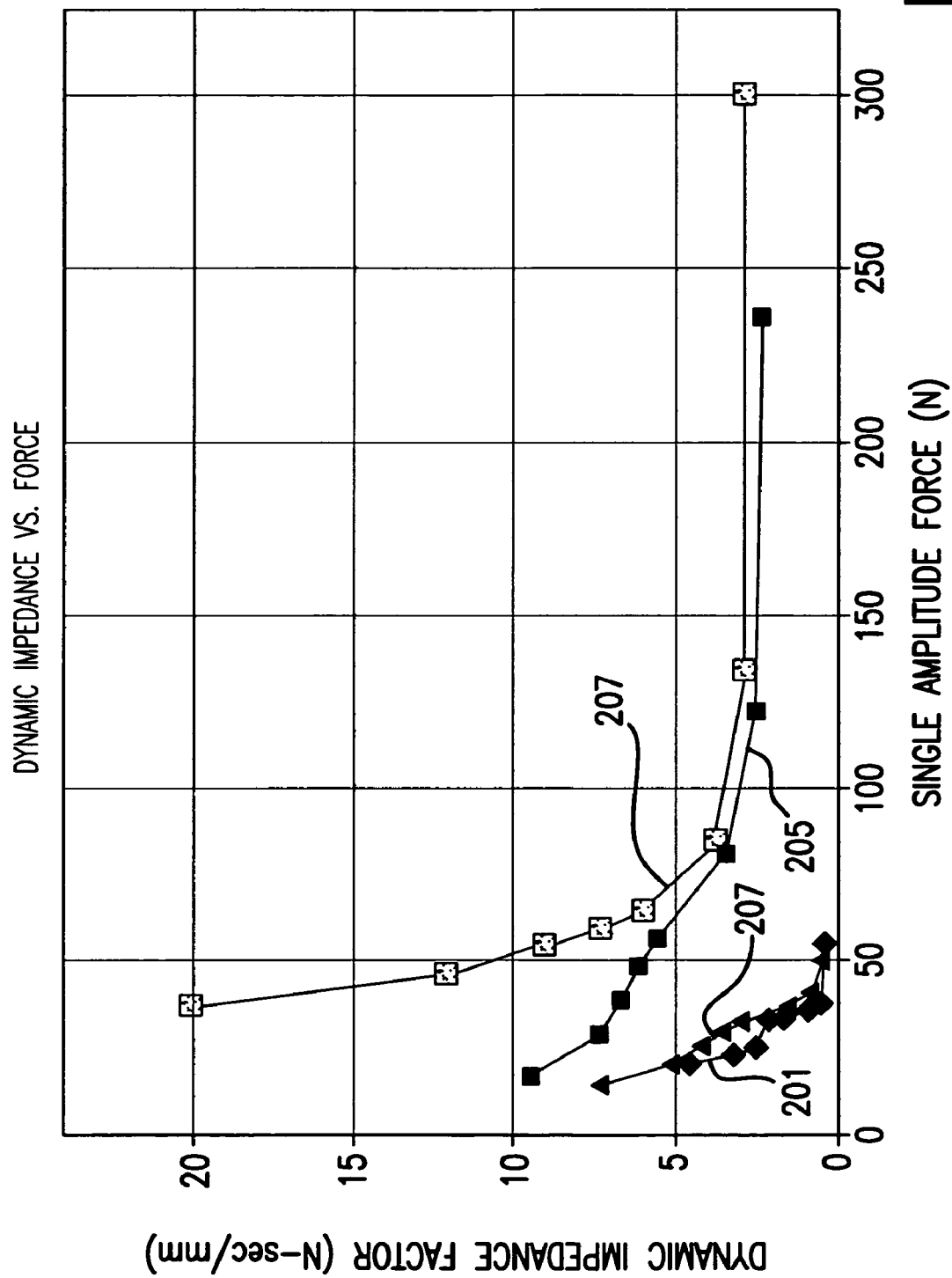
FIG. 18 is a graph plotting dynamic impedance as a function of force for several vehicles.

Dynamic stiffness $PhaseFactor = \arg(K) = a\tan\left(\frac{\text{imag}(K)}{\text{re}(K)}\right)$ FIGS. 17 and 18 exemplify that real damper forces, at very low levels of forces and velocities representative of operation on relatively smooth roads, do not correspond closely to ideal damper forces for which the force would be in phase (zero impedance phase factor) with the velocity. In FIG. 17 the phase factor is plotted as a function of the driving force (at the driven frequency) and in FIG. 18, the amplitude of the dynamic impedance gain factor is plotted as a function of the driving force (at the driven frequency). In each graph, as single amplitude driven forces (measured in Newtons) increase, the relative phase (measured in degrees), as well as the amplitude of the dynamic impedance (measured in Newtons-sec/mm) generally decrease.

Target line 201 is a plot of desired target response points, empirically selected for a smooth ride for the vehicle 10, on what is considered the smooth road surface. Line 203 is a plot of response points of a damper having second stage damping responding to the smooth road surface. For small sinusoidal excitations of less than 50 Newtons, the second stage performance results in a plot of points for the line 203 of the damper assembly which closely approximates the target line 201.

The lines 205 and 207 plot responses of other dampers, not having second stage damping, to smooth road inputs exemplified by the single amplitude forces plotted along the abscissas of FIGS. 17 and 18. As is seen in FIG. 17, lines 205 and 207 both have substantially higher phase factors at sinusoidal excitations less than 50 Newtons.

As is seen in FIG. 18, the response of the dampers represented by lines 205 and 207 remain substantially displaced from the target line 203 as sinusoidal excitation forces represented by the single amplitude forces increase toward the 50 Newton level, with the amplitude of the dynamic impedance gain factor remaining substantially higher when approaching and extending slightly past the 50 Newton level.

From the foregoing description, one skilled in the art can easily ascertain the essential characteristics of this invention, and without departing form the spirit and scope thereof, can make various changes and modifications of the invention to adapt it to various usages and conditions.

We claim:

1. Method for measuring the dynamic properties of a damper under low forces and velocities, representative of operation of a vehicle on relatively smooth roads, comprising:

controlling a test fixture for mounting the damper by inputting data for periodic sinusoidal excitations having a selected frequency and amplitude;

testing the damper while the damper is mounted in the test fixture to produce low amplitude test results in the damper, the test results comprising displacement, force and velocity parameters, measured as functions of time, and determining impedance phase factors and impedance gain factors as functions of driven force or velocity amplitudes.

2. The method of claim 1 wherein the frequency range is from about 5 Hz to about 30 Hz, wherein the amplitude displacement from peak-to-peak ranges from about 0.05 mm to about 2.00 mm and wherein the number of cycles is in the range of 1 to 1000.

3. The method of claim 2 wherein the number of test cycles for each amplitude is at least 200.

4. The method of claim 1 further including inputting into the test fixture a force indicative of a side load.

5. The method of claim 4 further inputting into the test fixture data indicative of dither caused by smooth road shake of the vehicle.

6. The method of claim 5 wherein the frequency range is from about 5 Hz to about 30 Hz, wherein the amplitude displacement from peak-to-peak ranges from about 0.05 mm to about 2.00 mm and wherein the number of cycles is in the range of 1 to 1000.

7. The method of claim 4 wherein the frequency range is from about 5 Hz to about 30 Hz, wherein the amplitude displacement from peak-to-peak ranges from about 0.05 mm to about 2.00 mm and wherein the number of cycles is in the range of 1 to 1000.

8. The method of claim 1 wherein displacement, velocity and force parameters for each cycle are calculated by averaging cycles for each parameter and using transforms.

9. The method of claim 8 wherein the frequency range is from about 5 Hz to about 30 Hz, wherein the amplitude displacement from peak-to-peak ranges from about 0.05 mm to about 2.00 mm and wherein the number of cycles is in the range of 1 to 1000.

10. The method of claim 1 wherein displacement, velocity and force parameters for each cycle are calculated by averaging cycles for each parameter and using transforms.

11. Method for measuring the dynamic properties of a damper under low forces and velocities, representative of operation of a vehicle on relatively smooth roads, comprising:

controlling a test fixture for mounting the damper by inputting data for low amplitude periodic sinusoidal excitations from smooth road shake having a frequency range of 5 to 30 Hz, a selected amplitude range of 0.05 to 2.00 mm and a selected dither representative of vehicle operation on relatively smooth roads;

setting the test fixture to conduct the test in test portions for separate amplitudes wherein each test portion is conducted for a number of cycles in the range of 1 to 1,000 cycles;

testing the damper while the damper is mounted in the test fixture to produce low amplitude test results, the test results, comprising displacement, force and velocity parameters, measured as functions of time;

determining force phase factors and dynamic impedance factors as a function of amplitude force to measure the ability of the damper to dampen smooth road shake.

12. The method of claim 11 wherein the number of test cycles for each amplitude is at least 200.

13. The method of claim 11 further including inputting into the test fixture a force indicative of a side load.

14. The method of claim 13 wherein displacement, velocity and force parameters for each cycle are calculated by averaging cycles for each parameter using transform algorithms.

15. The method of claim 14 wherein the transform algorithms are Fourier transform algorithms.

16. The method of claim 11 wherein displacement, velocity and force parameters for each cycle are calculated by averaging cycles for each parameter using transform algorithms.

17. The method of claim 16 wherein the transform algorithms are Fourier transform algorithms.

* * * * *